US008185431B2

(12) United States Patent  (10) Patent No.: US 8,185,431 B2
Abboa-Offei  (45) Date of Patent: May 22, 2012

(54) SYSTEM AND METHOD FOR FORECASTING AND PAIRING ADVERTISING WITH POPULAR WEB-BASED MEDIA

(76) Inventor: Kwabena Benoni Abboa-Offei, Boston, MA (US)

( * ) Notice: Subject to any disclaimer, the term of this patent is extended or adjusted under 35 U.S.C. 154(b) by 372 days.

(21) Appl. No.: 12/568,745

(22) Filed: Sep. 29, 2009

(65) Prior Publication Data

US 2010/0121682 A1  May 13, 2010

(51) Int. Cl.
  *G06F 9/46*  (2006.01)
(52) U.S. Cl. .................................................. 705/7.31
(58) Field of Classification Search ................ 705/7.31
  See application file for complete search history.

(56) References Cited

U.S. PATENT DOCUMENTS

| 7,930,208 | B2 * | 4/2011 | Sharman et al. | 705/14.53 |
| 2003/0212710 | A1 * | 11/2003 | Guy | 707/104.1 |
| 2005/0137939 | A1 * | 6/2005 | Calabria et al. | 705/26 |
| 2005/0144067 | A1 * | 6/2005 | Farahat et al. | 705/14 |
| 2006/0282328 | A1 * | 12/2006 | Gerace et al. | 705/14 |
| 2008/0103886 | A1 * | 5/2008 | Li et al. | 705/14 |
| 2008/0256056 | A1 * | 10/2008 | Chang et al. | 707/5 |
| 2009/0172728 | A1 * | 7/2009 | Shkedi et al. | 725/34 |

OTHER PUBLICATIONS

Szabo et al., "Predicting the popularity of online content", Social Computing Lab, HP Labs, Palo Alto CA, 10 pages, undated.
Dooley, "Neuromarketing", http://www.neurosciencemarketing.com/blog/articles/viral-video-success.htm, 6 pages, Dec. 12, 2008.

* cited by examiner

*Primary Examiner* — Romain Jeanty
(74) *Attorney, Agent, or Firm* — Seyfarth Shaw LLP; Joseph P. Quinn

(57) ABSTRACT

A system and method for identifying whether certain web-based media or web-based videos are likely to become popular is provided. Videos that are identified as having a strong likelihood of becoming popular with a particular demographic group are paired to advertisements or other media appropriate for the particular demographic group. Videos that are likely to be popular are identified by measuring early input rates such as request rates, replay rates, comment rates, forwarding rates and reply rates. Input rate patterns including pattern segments correlated to inputs from a particular demographic group are identified.

10 Claims, 4 Drawing Sheets

SYSTEM AND METHOD FOR FORECASTING AND PAIRING ADVERTISING WITH POPULAR WEB-BASED MEDIA

CROSS REFERENCE TO RELATED APPLICATIONS

This application claims benefit of U.S. Provisional Application No. 61/199,185, filed Nov. 13, 2008 and is incorporated herein by reference in its entirety.

FIELD OF THE INVENTION

The present invention relates to electronic commerce and more particularly to associating advertisements with appropriate web-based media content.

BACKGROUND OF THE INVENTION

Digital media content such as digital audio segments and digital video segments are commonly paired with advertisements for communication to internet users who request downloads of the content. Media content is known to become suddenly popular, or viral, among various groups of internet users. Often, the media content's popularity also decreases suddenly before advertisement providers have an opportunity to pair appropriate advertising with the content. It would be desirable to provide a system and method for predicting periods of popularity for specific media content and timely pairing of appropriate advertisements with predicted popular content.

SUMMARY OF THE INVENTION

An illustrative embodiment of the present invention provides a system for identifying whether certain web-based media or web-based videos will have a strong likelihood of being highly viewed in the near future. Illustrative embodiments provide the ability to automatically pair videos that are identified as having a strong likelihood of becoming popular with advertisements or other media. Illustrative embodiments of the invention also identify videos that are likely to be popular by measuring the early input rates such as request rates, comment rates, forwarding rates and reply rates.

The term "media," as used herein, may include any publications for which input rates may be measured, but typically includes electronically published media on a computer network such as the Internet, and more particularly includes web-based videos.

The term "Future Popular Media" (FPM) as used herein includes media that illustrative embodiments of the invention predict will become popular based on comparing the early input rates of "Previously-Popular Media" with input rates of new media during relevant time periods. New media that has similar input rates during the relevant time periods as previously popular media are tagged as Future Popular Media.

The process by which the invention pairs Future Popular Media with advertisements or other designated Media is referred to herein as "Popular Media Pairing" (PMP). Under the Popular-Media-Pairing process, the illustrative embodiment of the invention will analyze the relevant input rates of Previously-Popular Media and then flag new videos that have similar early or relevant Input Rate characteristics. When the embodiment identifies an FPM, it can automatically pair advertisements such as embedded banners, trailers, or other advertisements with the newly identified FPM.

Illustrative embodiments of the invention forecast whether certain media such as web-based videos and other web-based content will become popular or highly viewed in the future. Advertising is then paired with the media that is predicted to become popular. A high popularity period, which may be a fleeting period of frame can be predicted in advance. Monetization of popular content is improved by associating advertising with the content at an early time in its popularity trajectory in order to capture such early or fleeting periods of frame.

Another illustrative embodiment of the invention comprises a system for predicting media popularity. The illustrative system includes at least one processor system such as a general purpose computer in communication with a server on the computer network wherein the server executes software for monitoring input rates of new media, comparing the input rate patterns with input rate patterns of previously popular media, flagging new media having input rates which substantially match the input rate patterns of previously popular media, and providing an output identifying the flagged new media and/or automatically pairing an advertisement with the flagged new media.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION OF THE INVENTION

Figure 1:
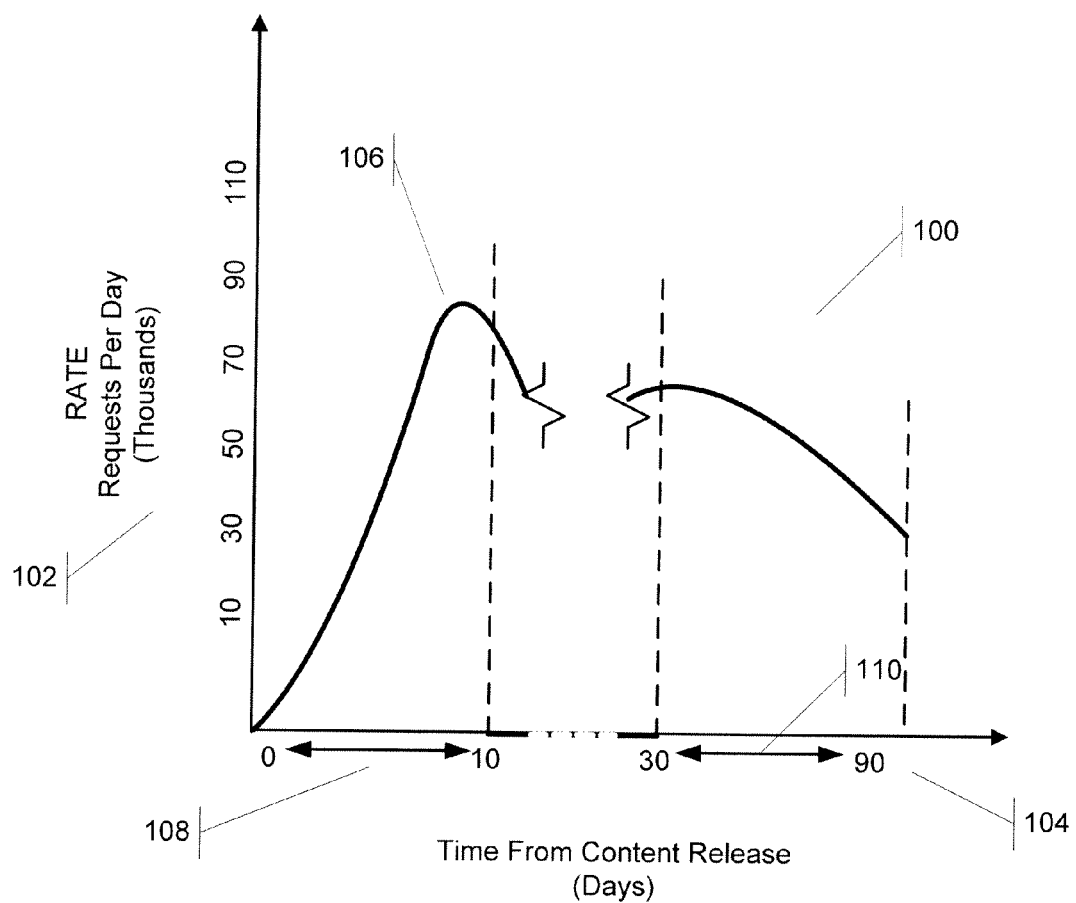
FIG. 1 is a graphical representation of a request rate pattern as an example of an input rate pattern associated with either previously popular media or new media according to illustrative embodiments of the present invention.

An illustrative embodiment of the present invention provides a system for identifying whether certain web-based media or web-based videos are likely to become popular in general or popular with particular demographic groups. Illustrative embodiments automatically pair videos that are identified as having a strong likelihood of becoming popular with a particular demographic group to advertisements or other media appropriate for the particular demographic group. Media that are likely to be popular are identified by measuring early input rates such as request rates, comment rates, forwarding rates and reply rates of the media and optionally of copies of the media. Input rate patterns including pattern segments correlated to inputs from a particular demographic group are identified.

Illustrative embodiments of the invention analyze data about the early input rates of previously popular media on a given website as compared to predictable patterns of consumer viewing. New media with input rate patterns similar to the previously popular media is flagged. For example, the illustrative embodiments may detect that 70% of all previously popular videos had, before the video became popular, (1) a request rate of 500 clicks per a given time interval, (2) a forward rate of 300 forwards per a given time interval, (3) a replay rate of 200 times per a given time interval, and (4) a comment rate of 300 comments per a given time interval. In the illustrative embodiment, videos that have input rates that are similar to those of previously popular videos are then flagged.

Early input rate patterns of previously popular videos are used to predict the popularity of new media. For example, if an illustrative embodiment detects that 70% of all previously popular videos had at least early input rates of 500 clicks, forwards, and replays per half hour, then each time that a new video matches that criteria the appropriate advertisement will automatically be paired with that video to thereby detect and forecast media popularity. Patterns may include input intensity rates in which bursts of activity are recognized. An input intensity rate may be an average number of inputs per second each hour, for example. One means for measuring input intensity rate, according to an illustrative embodiment of the invention, is to measure the length of time between clicks over a given period of time.

Illustratively, a request rate represents the number of times that viewers click on a video per given time interval for the purpose of watching the video. A click intensity rate may represent the number of views, replays, forwards, or comments per second during a particular period, for example, to measure the input intensity associated with each piece of media. A comment rate represents the number of viewers that comment on a video per given time interval. A forward rate represents the number of times the video clip is forwarded per given time interval. A replay rate represents the number of times the video clip is replayed by viewers per given time interval.

Persons having ordinary skill in the art should appreciate that various means are known for acquiring click rates over networked computer systems. For example, advertisement servers have long counted click rates on networked computers to measure the effectiveness of various advertising campaigns such as banner advertisements on internet web sites.

Although various embodiments of the invention are described primarily with reference to request rates, it should be understood that other input rates such as comment rates, forwarding rates and replay rates can be used according to the teachings of the present disclosure within the scope of the present invention. It is also explicitly contemplated within the scope of the present invention that input rate patterns may be multi-dimensional, for example, wherein more than one type of input rate is included in a pattern. An illustrative multi-dimensional input rate pattern could include an analysis of a combination of the number of request rates, forward rates, replay rates and comment rates per a given time interval or intervals, for example.

Persons having ordinary skill in the art should appreciate that various means that are known for pattern matching can be used to perform the pattern matching steps of the various embodiments of the present invention. For example, such pattern matching can be performed by curve fitting using any one of a number of curve fitting software tools and well known algorithms.

An input rate pattern according to an illustrative embodiment of the invention is described with reference to FIG. 1. The pattern 100 is generated by acquiring a number of requests per day 102 for a specific media content such as a digital videos segment over an extended period of time 104 such as 90 days, for example from the time the media content segment becomes available or is otherwise identified for consideration.

Requests for digital media are typically manifested as mouse-clicks by users requesting a download of the media from an internet website. When specific media content such as an imminently popular video segment either first becomes available, or is first noticed by viewers, an input pattern develops such as an initial spike 106 in requests for the content. Such initial popularity indicated by a first pattern segment 108 typically reflects interest in the media by a particular demographic group, such as young internet users, college students and/or other frequent video downloaders.

An input rate pattern may also include later pattern segments such as second pattern segment 110 of FIG. 1 that is identifiable as being correlated to popularity of the requested media among one or more different demographic groups including older consumers, infrequent computer users and/or senior citizens. Other pattern segments may be identified as being correlated to popularity among other demographic groups such as a population of a defined geographic area or region, for example.

In one example, an embodiment of the invention monitors click intensity rates wherein a pattern of high click intensity, i.e., short average time between user inputs over a period, are recognized as a pattern, or portion of a pattern, that may indicate imminent viral popularity of a piece of media. For example, an input rate that is averaging 100 clicks per second for one hour may be identified as a pattern that is predictive of imminent viral popularity of a video or other media item.

Figure 2:
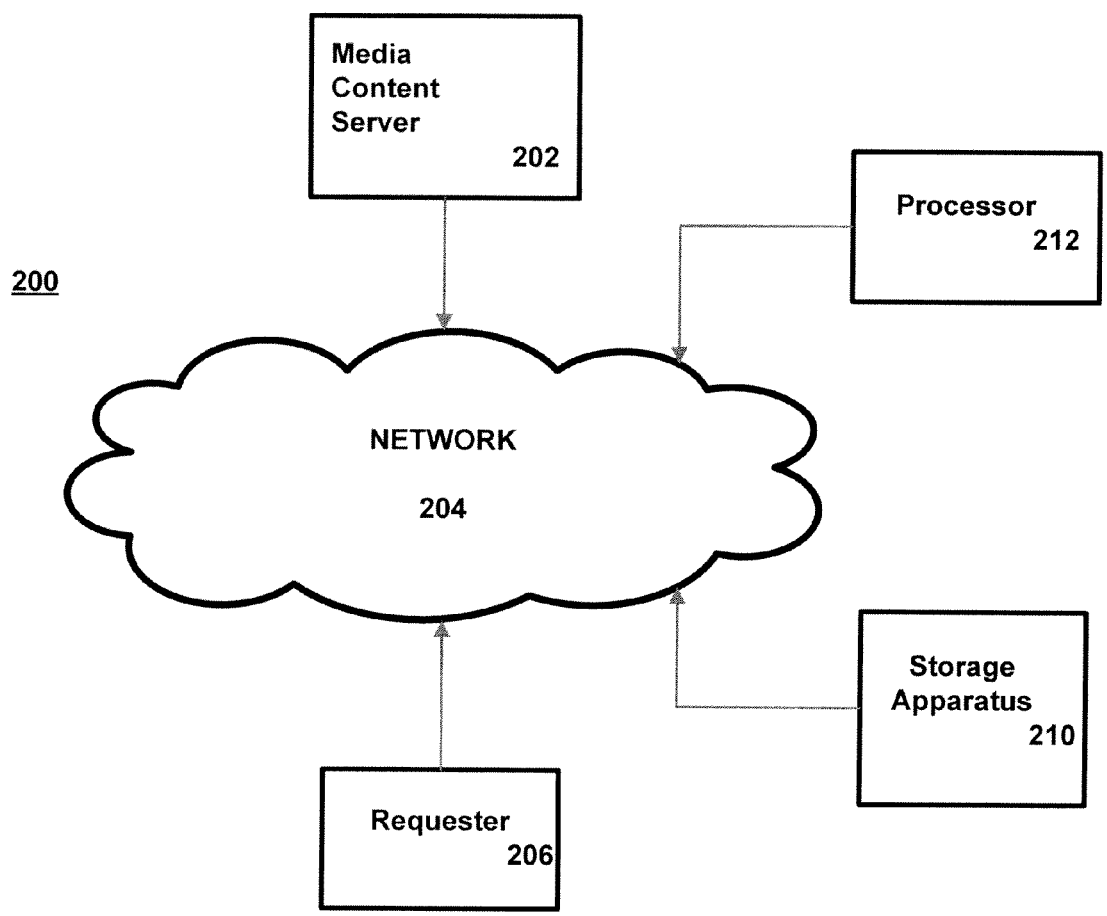
FIG. 2 is a block diagram illustrating a computer implemented system for communicating with a demographically distinct group according to an illustrative embodiment of the invention.

A computer implemented system for communicating with a demographically distinct group is described with reference to FIG. 2. The system 200 includes at least one media content server 202 configured to provide media content over a network 204 in response to a request received from a requester 206 over the network 204. The system 200 also includes a computer storage apparatus 210 in communication with the network. The storage apparatus 210 stores one or more messages targeted toward specific demographically distinct groups.

At least one processor 212 is programmed to monitor input rates such as the rates of requests for specific media content. The processor 212 is further programmed to compare the monitored rates for with previously identified input rate patterns such as request rate patterns indicative of requesters being members of a demographically distinct group. The processor 212 is programmed to provide a message, such as a targeted advertisement, to the requester in response to the input rates matching the previously identified input rate pattern.

A pattern as described herein may define an entire trajectory of input rates over time, or may refer to a portion of a larger pattern or trajectory. In an illustrative embodiment patterns comprise pre-identified portions of request rate trajectories, for example.

A computer implemented method for predicting popularity of media according to an illustrative embodiment of the invention is described with reference to FIG. 3. The method 300 includes the step of storing early request rate patterns of previous popular media on at least one computer 302. A step of monitoring request rate patterns of new media by a computer is performed 304. The computer compares the request rate patterns of the new media with request rate patterns of the previously popular media 306. If the request rate patterns of new media substantially match 308 the input rate patterns of previously popular media then the computer identifies the new media as future popular media 310. The computer then pairs at least one advertisement with the future popular media 312.

A computer may also associate request rate patterns of previous popular media with requesters being likely members of a demographically distinct group; and pair advertisements directed to the demographically distinct group with requested media content in response to request rate patterns of the requested media content substantially matching at least one of said request rate patterns associated with the demographically distinct group.

In an illustrative embodiment, the computer implemented method described with reference to FIG. 3 can also include the steps of communicating the paired advertisement(s) along with the future popular media to a requester of the future popular media.

Figure 3:
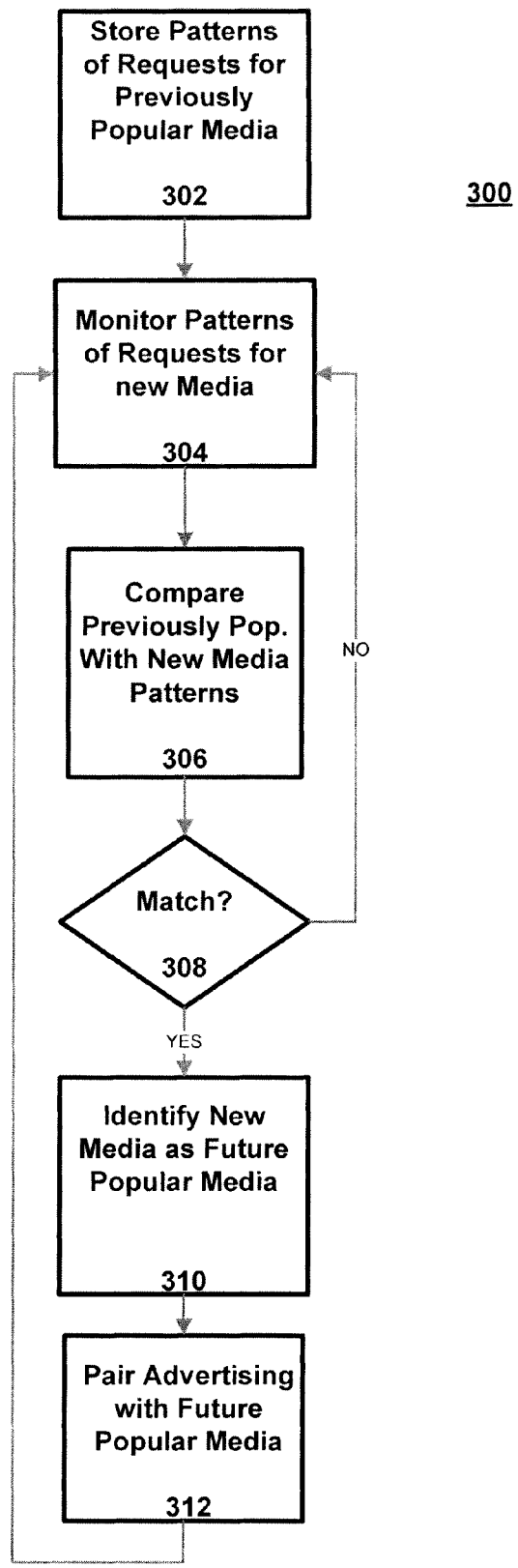
FIG. 3 is a process flow diagram illustrating a method for predicting popularity of media according to an illustrative embodiment of the invention.

It should be understood that the computer(s) described as performing the steps of the computer implemented method with reference to FIG. 3, may be a single computer or may be a plurality of computers in communication over one or more networks to perform distributed processing of the steps, for example.

Figure 4:
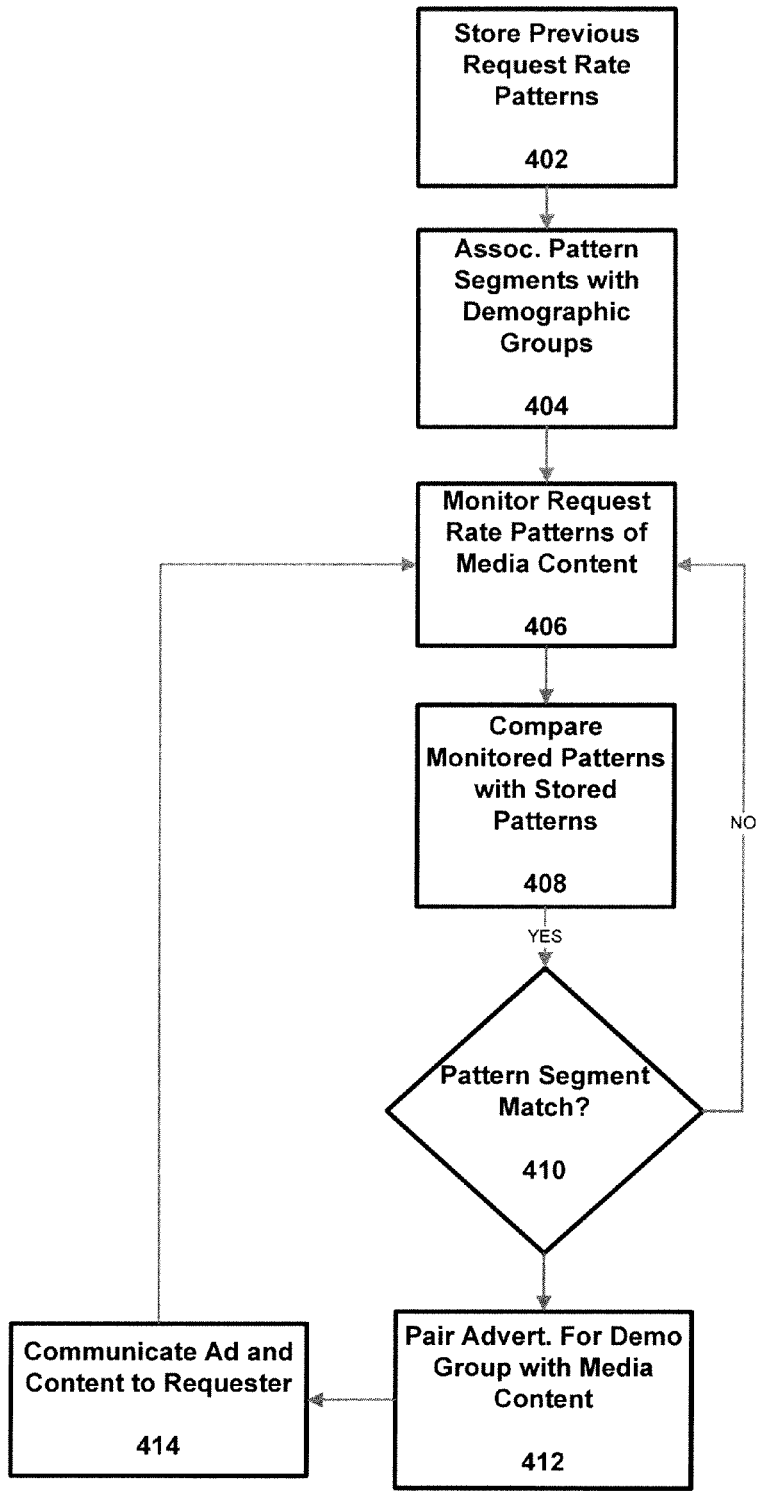
FIG. 4 is a process flow diagram illustrating a method for associating advertisements with media for a demographically distinct group according to an illustrative embodiment of the present invention.

A method for providing targeted advertisements according to an illustrative embodiment of the invention is described with reference to FIG. 4. The method 400 includes the steps of storing, by at least one computer, request rate patterns of specific media content requested by requesters over a network 402. Segments of request rate patterns of said previously popular media are associated by a computer with requesters being likely members of a demographically distinct group 404. A computer monitors request rate patterns of new media content 406 and compares the request rate patterns of the new media with request rate patterns of the previously popular media 408. If request rate patterns of the requested media content substantially matches 410 at least one of the request rate pattern segments associated with the demographically distinct group, then the computer pairs advertisements directed to the demographically distinct group with requested media content 412. The advertisement and media content are then communicated to the requester 414.

The illustrative embodiment described with reference to FIG. 4 may also include the steps of associating an initial popularity pattern segment with a first demographic group. The first demographic group may include consumers in a ten year old to thirty year old demographic group, college students, and frequent media content viewers and urban residents, for example. The illustrative embodiment may also include the step of associating one or more late popularity pattern segments with a second demographic group. The second demographic group may include consumers in a thirty year old to seventy five year old demographic group and rural residents, for example. The request rate patterns may thereby provide popularity trajectories including in initial popularity pattern segment associated with a first demographic group and one or more late popularity segments associated with a second demographic group.

While the invention has been described with reference to illustrative embodiments, it should be understood by those skilled in the art that various other changes, omissions, and/or additions may be made and substantial equivalents may be substituted for elements thereof without departing from the spirit and scope of the invention. In addition, many modifications may be made to adapt a particular situation or material to the teaching of the invention without departing from the scope thereof. Therefore, it is intended that the invention not be limited to the particular embodiment disclosed for carrying out this invention, but that the invention will include all embodiments, falling within the scope of the appended claims.

Moreover, unless specifically stated any use of the terms first, second, etc., do not denote any order of importance, but rather the terms first, second, etc. are used to distinguish one element from another.

What is claimed is:

1. A method for predicting popularity of a media, comprising:
    storing early input rate patterns of previously popular media on at least one computer;
    monitoring input rate patterns of new media by said at least one computer; comparing, by said at least one computer, said input rate patterns of said new media with said input rate patterns of said previously popular media;
    identifying, by said at least one computer, said new media as future popular media in response to said input rate patterns of said new media substantially matching said input rate patterns of said previously popular media;
    associating input rate patterns of previous popular media with requesters being likely members of a demographically distinct group; and associate
    pairing advertisements directed to said demographically distinct group with requested media content in response to input rate patterns of said requested media content substantially matching at least one of said input rate patterns associated with said demographically distinct group.

2. The method of claim 1, further comprising:
    pairing at least one advertisement with said future popular media by said at least one computer.

3. The method of claim 2, further comprising:
    communicating said at least one advertisement along with said future popular media to a requester of said future popular media by said at least one computer.

4. The method of claim 1, wherein said previously popular media and said future popular media comprise digital video segments.

5. A method for providing targeted advertisements, comprising:
    storing, by at least one computer, request rate patterns of specific media content requested by requesters over a network;
    associating segments of request rate patterns of said previously popular media with requesters being likely members of a demographically distinct group;
    monitoring request rate patterns of new media content by said at least one computer;
    comparing, by said at least one computer, said request rate patterns of said new media with said request rate patterns of said previously popular media; and
    pairing, by said at least one computer, advertisements directed to said demographically distinct group with requested media content in response to request rate patterns of said requested media content substantially matching at least one of said request rate pattern segments associated with said demographically distinct group.

6. The method of claim 5 comprising: associating an initial popularity pattern segments with a first demographic group.

7. The method of claim 6 wherein said first demographic group is selected from the group consisting of consumers in a ten year old to thirty year old demographic group, college students, and frequent media content viewers and urban residents.

8. The method of claim 6, comprising:

association one or more late popularity pattern segments with a second demographic group.

9. The method of claim 8, wherein said second demographic group is selected from a group consisting of consumers in a thirty year old to seventy five year old demographic group, rural residents, and media content viewers who normally view media after frequent media content viewers.

10. The method of claim 5, wherein said request rate patterns comprise popularity trajectories including in initial popularity pattern segment associated with a first demographic group and one or more late popularity segments associated with a second demographic group.

* * * * *